United States Patent

Matsumori

(10) Patent No.: US 9,965,290 B2
(45) Date of Patent: May 8, 2018

(54) PARALLEL COMPUTER, INITIALIZATION METHOD OF PARALLEL COMPUTER, AND NON-TRANSITORY MEDIUM FOR STORING A PROGRAM

(71) Applicant: FUJITSU LIMITED, Kawasaki-shi, Kanagawa (JP)

(72) Inventor: Hitoshi Matsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 137 days.

(21) Appl. No.: 15/206,356

(22) Filed: Jul. 11, 2016

(65) Prior Publication Data

US 2017/0024222 A1 Jan. 26, 2017

(30) Foreign Application Priority Data

Jul. 23, 2015 (JP) .................................. 2015-145578

(51) Int. Cl.
 *G06F 9/00* (2006.01)
 *G06F 15/177* (2006.01)
 *G06F 9/44* (2018.01)
 *G06F 12/0842* (2016.01)

(52) U.S. Cl.
 CPC ........ *G06F 9/4405* (2013.01); *G06F 12/0842* (2013.01); *G06F 2212/6042* (2013.01)

(58) Field of Classification Search
 CPC ............... G06F 9/4405; G06F 12/0842; G06F 2212/6042
 See application file for complete search history.

(56) References Cited

U.S. PATENT DOCUMENTS

| 2008/0005549 | A1 | 1/2008 | Ke | |
| 2009/0094450 | A1* | 4/2009 | Krzyzanowski | G06F 8/65 713/100 |
| 2014/0325200 | A1* | 10/2014 | Nitta | G06F 9/4405 713/2 |

FOREIGN PATENT DOCUMENTS

| JP | 2000-305912 | 11/2000 |
| JP | 2008-016020 | 1/2008 |
| JP | 2009-223496 | 10/2009 |

* cited by examiner

*Primary Examiner* — Xuxing Chen
(74) *Attorney, Agent, or Firm* — Fujitsu Patent Center

(57) ABSTRACT

A parallel computer includes a first processor, a second processor, and a first storage device. The first processor outputs, in response to an instruction for starting up the parallel computer, a first read-out request causing the first storage device to transmit a command of an initialization process to the first processor. The first processor executes the initialization process of the first processor by using the command received from the first storage device. The second processor monitors, in response to the instruction for starting up the parallel computer, a signal transmitted between the first processor and the first storage device. The second processor detects, from the signal monitored, the command output from the first storage device. And, the second processor is configured to execute the initialization process of the second processor by using the detected command.

12 Claims, 13 Drawing Sheets

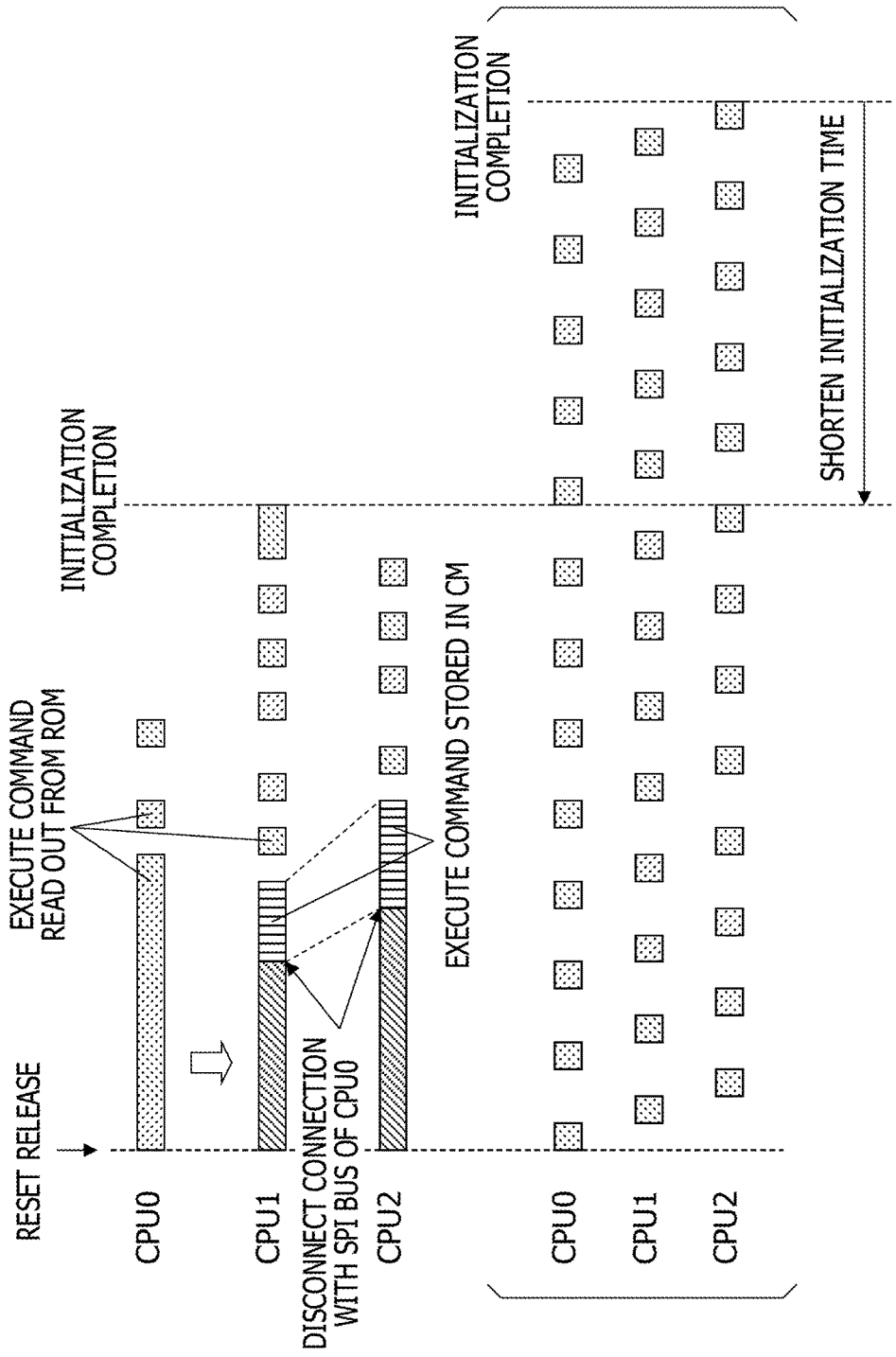

PARALLEL COMPUTER, INITIALIZATION METHOD OF PARALLEL COMPUTER, AND NON-TRANSITORY MEDIUM FOR STORING A PROGRAM

CROSS-REFERENCE TO RELATED APPLICATION

This application is based upon and claims the benefit of priority of the prior Japanese Patent Application No. 2015-145578, filed on Jul. 23, 2015, the entire contents of which are incorporated herein by reference.

FIELD

The embodiments discussed herein are related to a parallel computer, and initialization method of a parallel computer, and a startup program.

BACKGROUND

A computer which includes a processing unit such as a central processing unit (CPU) loads an initialization program such as a basic input output system (BIOS) from a storage device to the processing unit during startup of the computer. Similarly, a parallel computer which includes a plurality of processing units loads an initialization program such as a BIOS from a shared storage device to each processing unit during startup of the parallel computer. For example, a control circuit which controls loading of the initialization program is connected to each processing unit and the storage device in order to load the initialization program from the shared storage device to each processing unit, and each processing unit is connected to the storage device via the control circuit. The control unit connected to each processing unit and the storage device operates in mutual cooperation based on a read-out request output by one processing unit, reads out the initialization program from the storage device and transfers the initialization program to the plurality of processing units in parallel. In a case where an external port which receives the initialization program is connected to one processing unit, the one processing unit which receives the initialization program via the external port transfers the received initialization program to the other processing units. During startup of the computer, a portion of the initialization program is executed by the processing unit after being loaded to the cache memory which operates as a random access memory (RAM). The remaining initialization program is executed by the processing unit after being loaded to the system memory.

Examples of the related art include Japanese Laid-open Patent Publication No. 2000-305912, Japanese Laid-open Patent Publication No. 2009-223496, and Japanese Laid-open Patent Publication No. 2008-16020.

SUMMARY

According to an aspect of the invention, a parallel computer includes a first processing unit, a second processing unit, and a first storage device. The first processing unit is configured to output, in response to an instruction for starting up the parallel computer, a first read-out request to a first storage device, the first read-out request causing the first storage device to transmit a command of an initialization process to the first processing unit. The first processing unit is configured to execute the initialization process of the first processing unit by using the command received from the first storage device.

The second processing unit is configured to monitor, in response to the instruction for starting up the parallel computer, a signal transmitted between the first processing unit and the first storage device. The second processing unit is configured to detect, from the signal transmitted between the first processing unit and the first storage device, the command output from the first storage device. And, the second processing unit is configured to execute the initialization process of the second process unit by using the detected command.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating an example of the effects of shortening the initialization time of the parallel computer including a connection control circuit illustrated in FIG. 12.

DESCRIPTION OF EMBODIMENTS

Figure 1:
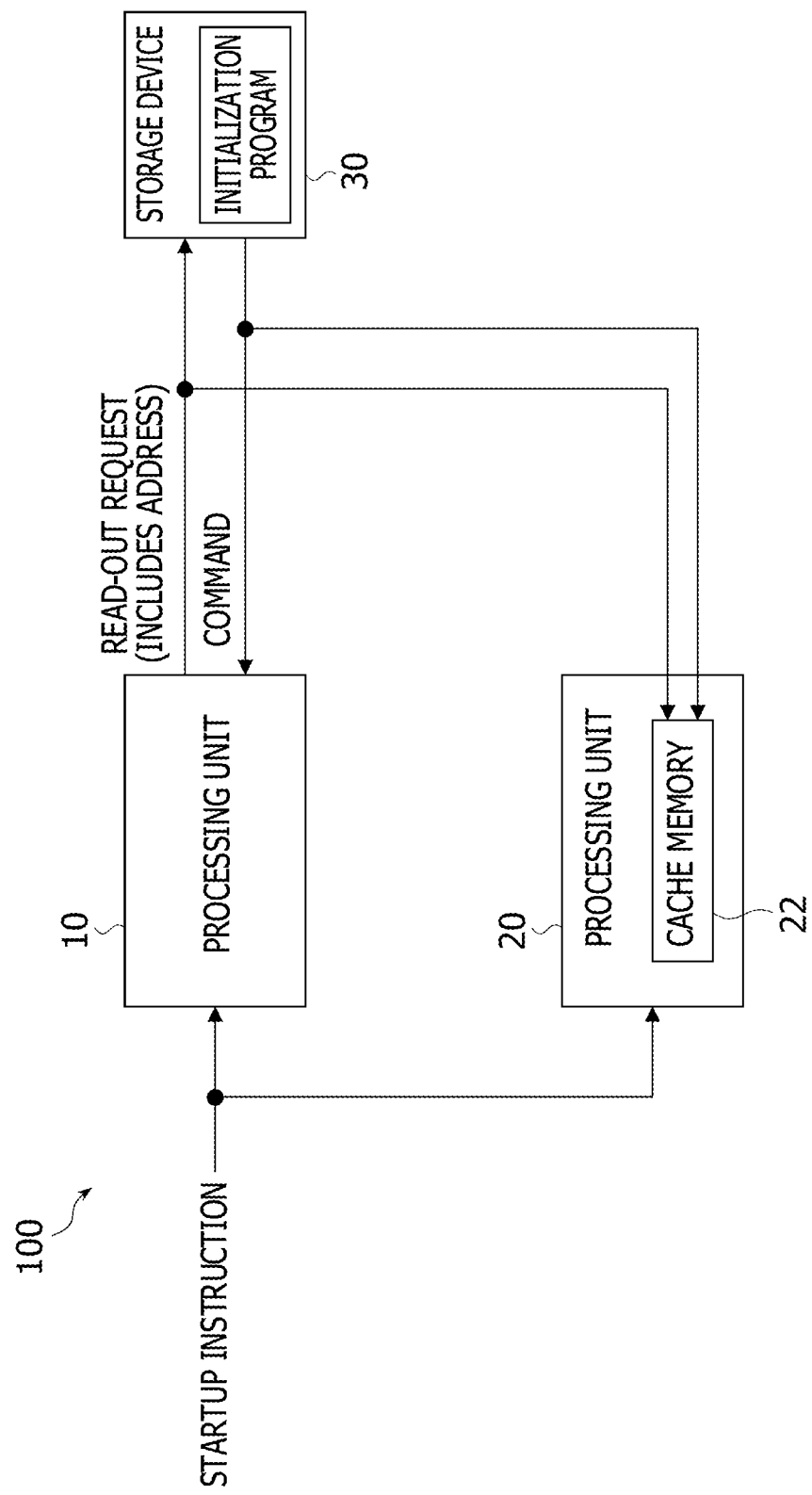
FIG. 1 is a diagram illustrating an embodiment of a parallel computer, an initialization method of a parallel computer, and a startup program.

With respect to the parallel computer as described in the background, in a case where the plurality of processing units loads the initialization program from the shared storage device during startup of the parallel computer, there is a conflict in the access to the storage device and the time until the initialization program is loaded to each processing unit becomes longer than in a case where there is no conflict in access. As a result, the time until startup of the parallel computer completes becomes longer, and the ease of use of the computer is lowered.

In one aspect of the embodiment, provided are techniques for shortening a time until the startup of the parallel computer completes.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Below, embodiments of the disclosure will be described using the drawings. The same reference numerals as the signal name are used in the signal line by which the information such as a signal is transmitted.

FIG. 1 illustrates an embodiment of a parallel computer, an initialization method of a parallel computer, and a startup program. The parallel computer 100 illustrated in FIG. 1 includes processing units 10 and 20 and a storage device 30. The processing units 10 and 20 are processors such as central processing units (CPU) and the processing unit 20 includes a cache memory 22. The processing unit 10 may include a cache memory 22.

The storage device 30 is a nonvolatile memory such as a read only memory (ROM). In a case where parallel computer 100 is started up, the storage device 30 stores commands (initialization program) for executing the initialization process which initializes hardware or the like which is built into each of the processing units 10 and 20.

The processing unit 10 outputs the read-out request which reads out commands of the initialization program which executes the initialization process to the storage device 30 based on a startup instruction which starts up the parallel computer 100 and receives commands output from the storage device 30 based on the read-out request. The processing unit 10 executes the initialization process by executing the received commands. The startup instruction may be generated by the parallel computer 100 during powering up (starting up) of the parallel computer 100 or during release of a reset of the parallel computer 100. The read-out request includes an address which indicates a storage area of the storage device 30 in which the commands read out from the storage device 30 are stored. The processing unit 10 may output the address to the storage device 30 after the read-out request is output.

The processing unit 20 monitors information output from the processing unit 10 and information output from the storage device 30 based on the startup instruction. In a case where a read-out request output from the processing unit 10 and commands output from the storage device 30 are detected, the processing unit 20 stores the address included in the detected read-out request and the detected commands in the cache memory 22. The processing unit 20 executes the initialization process by executing the commands stored in the cache memory 22. In other words, the processing unit 20 steals the address output from the processing unit 10 to the storage device 30 and the commands output from the storage device 30 to the processing unit 10 and executes the stolen commands.

For example, the cache memory 22 includes a plurality of cache lines identified by the middle order bit group of the address output by the processor core of the processing unit 20. Each cache line includes a tag area in which the upper order bit group or the like of the address output by the processor core of the processing unit 20 is stored and a data area in which data corresponding to the address or commands are stored. The address includes an upper order bit group, a middle order bit group, and a lower order bit group.

The processing unit 20 which receives the address output from the processing unit 10 stores the upper order bit group of the address in the tag area of the cache line identified by the middle order bit group of the address. The processing unit 20 which receives the commands output from the storage device 30, stores the received commands in the storage area indicated by the lower order bit group of the address previously received in the data area of the cache line which stores the upper order bit group of the address.

In so doing, after the commands are stored in the cache memory 22, the address output by the processor core of the processing unit 20 in order to fetch the commands is a cache hit. The processor core executes the commands (initialization program) read out from the cache memory 22 by the cache hit. The processing unit 20 is initialized by executing the commands stored in the cache memory 22 without accessing the storage device 30.

Figure 2:
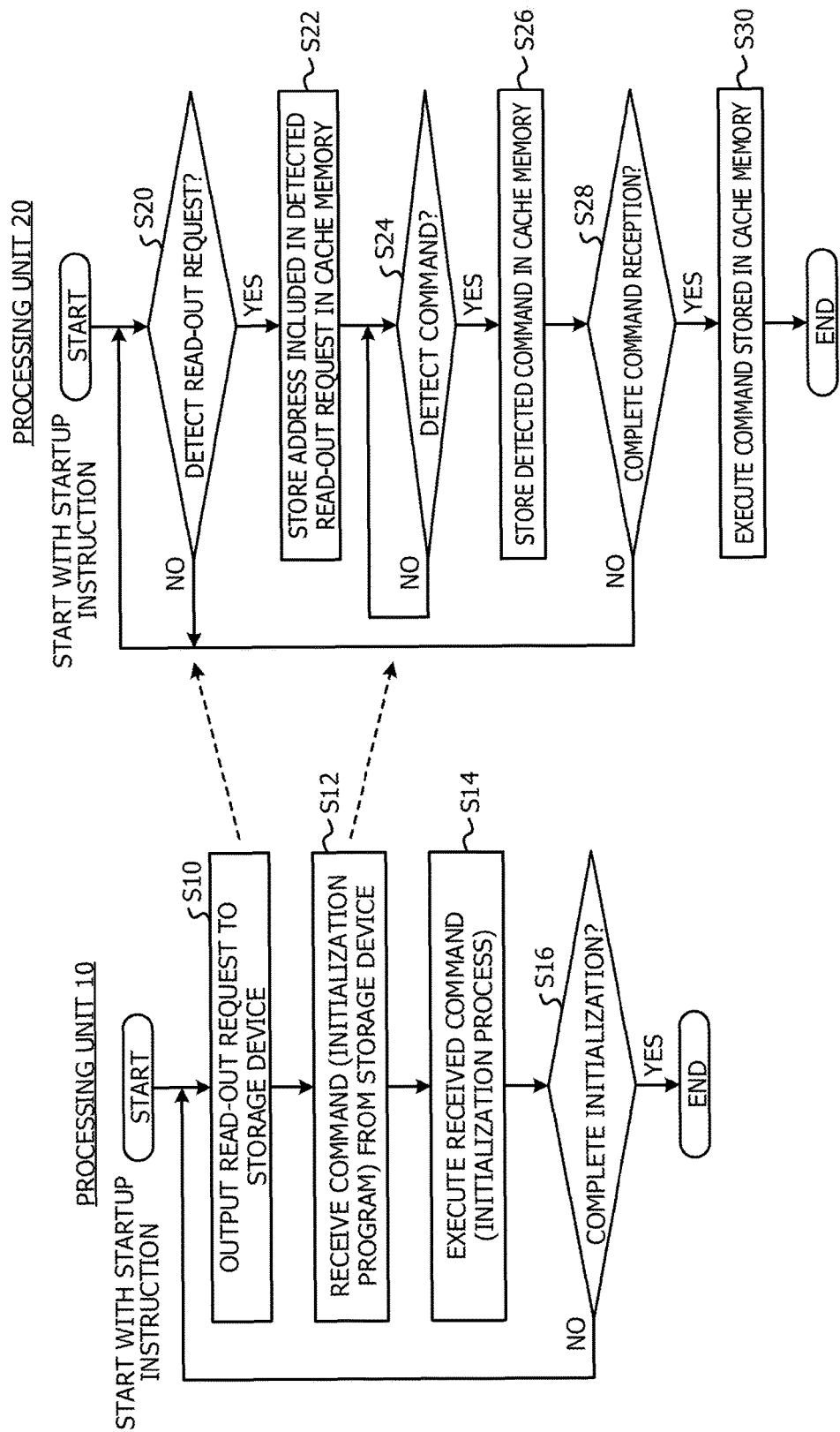
FIG. 2 is a diagram illustrating an example of an initialization process of the parallel computer illustrated in FIG. 1.

FIG. 2 illustrates an example of the operation of the parallel computer 100 illustrated in FIG. 1. The operation illustrated in FIG. 2 illustrates the initialization method of the parallel computer 100.

In a case where a startup instruction is received, the processing unit 10 outputs the read-out request to the storage device 30 in Step S10. Next, in Step S12, the processing unit 10 receives the commands output from the storage device 30 based on the read-out request. Next, in Step S14, the processing unit 10 executes the initialization process which initializes the processing unit 10 by executing the received commands. Next, in Step S16, the processing unit 10 completes the operation in a case where the initialization process is completed or returns the operation to Step S10 and outputs the read-out request to the storage device 30 in a case where the initialization process is not completed. The operations in Step S10 to Step S16 are executed by hardware such as the processor core in the processing unit 10.

Meanwhile, in a case where a startup instruction is received, the processing unit 20 monitors the information output by the processing unit 10 to the storage device 30 in Step S20 and transitions the operation to Step S22 in a case where the output of a read-out request is detected. In Step S22, the processing unit 20 stores the address included in the detected read-out request in the cache memory 22 and transitions the operation to Step S24.

In Step S24, the processing unit 20 monitors the information output by the storage device 30 to the processing unit 10 and transitions the operation to Step S26 in a case where the output of the commands is detected. In Step S26, the processing unit 20 stores the detected commands in the cache memory 22 in association with the address stored in Step S22 and transitions the operation to Step S28.

In Step S28, the processing unit 20 transitions the operation to Step S30 in a case where reception of the commands (initialization program) for executing the initialization process is completed and returns the operation to Step S20 in a case where all of the commands for executing the initialization process are not received. For example, the processing unit 20 determines whether or not the reception of the commands is completed based on a predetermined combination of commands being received. In Step S30, the processing unit 20 sequentially executes commands stored in the cache memory 22 and executes the initialization process. The operations from Step S20 to Step S30 are executed by hardware such as a processor core of the processing unit 20, a monitoring circuit which monitors access of the storage device 30 by the processing unit 10, and a control circuit which controls the operation of the cache memory 22. For example, the hardware, such as the monitoring circuit and control circuit, is built into the processing unit 20. The operations from Step S20 to Step S30 may be realized by a startup program executed by the processing unit 20. In this case, the startup program is stored in advance in a nonvolatile built-in memory provided inside the processing unit 20.

In the parallel computer 100 illustrated in FIG. 1, since the processing unit 20 monitors the commands (initialization program) which are transported to the processing unit 10 from the storage device 30 in response to the read-out request from the processing unit 10, the processing unit 20 is able to acquire and execute the commands (initialization program) for the initialization process stored in the storage device 30 without outputting the read-out request from the processing unit 20 to the storage device 30. Hence, a conflict between a read-out request from the processing unit 10 and the read-out request from the processing unit 20 is avoided. Therefore, it is possible to quickly execute the initialization process executed by each of the processing units 10 and 20 compared to a case where the processing units 10 and 20 each access the storage device 30 and read out commands from the storage device 30. As a result, it is possible to shorten the time until startup (that is, initialization of the processing units 10 and 20) of the parallel computer 100 completes compared to a case where the processing units 10 and 20 each read out commands from the storage device 30. In a case where the storage device 30 stores only commands (initialization program) which initialize the processing units 10 and 20, it is possible to not include a mechanism which arbitrates the read-out request output from each of the processing units 10 and 20.

In a case where three or more processing units are mounted in the parallel computer 100, the parallel computer 100 includes one processing unit 10 and a plurality of processing units 20. In this case, only one processing unit 10 outputs the read-out request to the storage device 30, and the plurality of other processing units 20 steal the address and commands transferred between the processing unit 10 and the storage device 30. Accordingly, even in a case where three or more processing units are mounted in the parallel computer 100, it is possible to shorten the time unit the startup of the parallel computer 100 is completed. Accordingly, the effects of shortening the time until startup of the parallel computer 100 completes increase as the number of processing units mounted in the parallel computer 100 increases.

Figure 3:
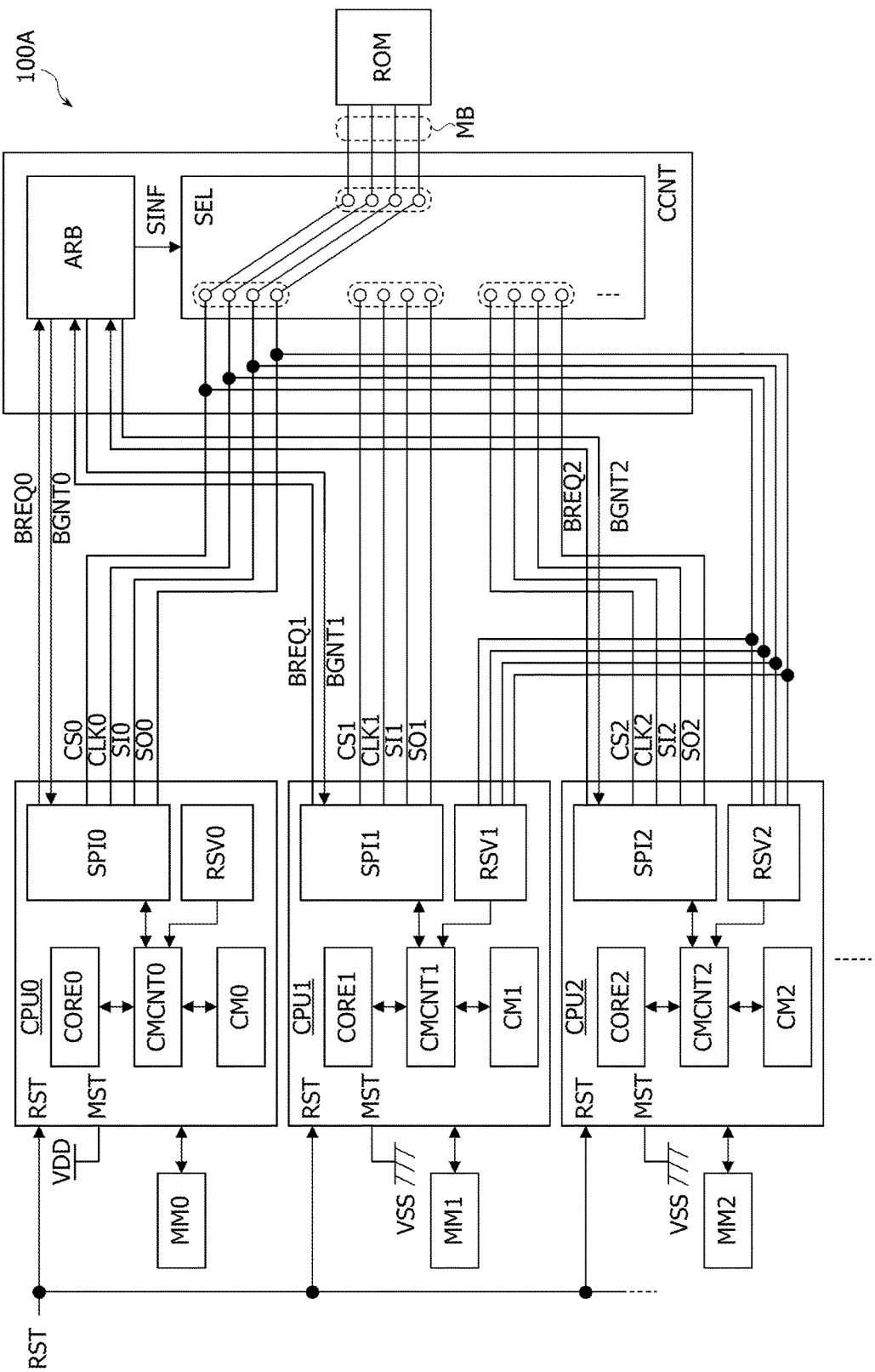
FIG. 3 is a diagram illustrating another embodiment of a parallel computer, an initialization method of a parallel computer, and a startup program.

FIG. 3 illustrates another embodiment of the parallel computer, the initialization method of the parallel computer, and the startup program. The parallel computer 100A according to the embodiment includes a plurality of CPUs (CPU0, CPU1, and CPU2), a plurality of main storage devices MM (MM0, MM1, and MM2), a connection control device CCNT and a ROM. The CPU is an example of the processing unit and the ROM is an example of the first storage device.

Each CPU includes a processor core CORE (CORE0, CORE1, CORE2), a cache memory CM (CM0, CM1, CM2), and a cache controller CMCNT (CMCNT0, CMCNT1, CMCNT2). Each CPU includes a communication interface section SPI (SPI0, SPI1, SPI2) and a receiving section RSV (RSV0, RSV1, RSV2). The connection control device CCNT includes an arbitration section ARB and a selector SEL.

Each CPU includes a reset terminal RST which receives the reset signal RST. In a case where the reset signal RST is changed from the reset release level to the reset level, each CPU resets the internal state of the hardware or the like. In a case where the reset signal RST is changed from the reset level to the reset release level, each CPU executes the initialization process which initializes the hardware and the like by executing the initialization program stored in the ROM. The operating system (OS), application programs, and the like enter an executable state due to the execution of the initialization process. Below, the change of the reset signal RST from the reset level to the reset release level is also referred to as a release of the reset signal RST or a reset release.

The initialization program is firmware, such as a BIOS or a unified extensible firmware interface (UEFI). The OS and the application program are stored in the main storage device MM (MM0, MM1, MM2) connected to each CPU. The reset signal RST which changes the reset level to the reset release level is generated by a reset generation circuit of the parallel computer 100A during powering up of the parallel computer 100A or during the reset release of the parallel computer 100. Each processor core CORE of the CPU executes the initialization program in order to initialize the CPU based on the reset release.

Each CPU includes a master terminal MST which receives a high level, such as a power source voltage VDD, or a low level, such as a ground voltage VSS. The CPU0 which receives the high level with the master terminal MST operates as a master device which executes the initialization program stored in the ROM based on the release of the reset signal RST. The CPU1 and CPU2 which receive the low level with the master terminal MST operates as a slave device which stores the address and commands transferred between the CPU0 and the ROM in the cache memory CM based on the release of the reset signal RST. The number of CPUs which operate as slave devices may be one or may be three or more.

Each cache memory CM includes a plurality of cache lines indicated by the middle order bit group of the address output by the processor core CORE, similarly to the cache memory 22 illustrated in FIG. 1. Each cache line includes a tag area in which the upper order bit group or the like of the address output by the processor core CORE is stored and a data area in which data corresponding to the address or commands are stored. The storage capacity of each cache memory CM may be the same as or different from one another.

Each cache memory CM holds a portion of the data or commands output from the ROM or the main storage device MM. The initialization program transferred from the ROM to the CPU0 is stored in the cache memory CM1 with the address before the CPU1 is initialized. The CPU1 executes the initialization process by executing the initialization program stored in the cache memory CM1 without accessing the ROM and is initialized. Similarly, the initialization program transferred from the ROM to the CPU0 is stored in the cache memory CM2 with the address before the CPU2 is initialized. The CPU2 executes the initialization process by executing the initialization program stored in the cache memory CM2 without accessing the ROM and is initialized.

Each cache controller CMCNT functions as a memory controller and includes a function of controlling the operation of the communication interface section SPI and the receiving section RSV and controls the operation of each cache memory CM. For example, the cache controller CMCNT outputs the instruction for accessing the ROM to the communication interface section SPI in a case where the address allocated to the ROM is a cache miss. The cache controller CMCNT outputs the instruction for accessing the main storage device MM to the memory controller (not shown) connected to the main storage device MM in a case where the address allocated to the main storage device MM is a cache miss.

Figure 6:
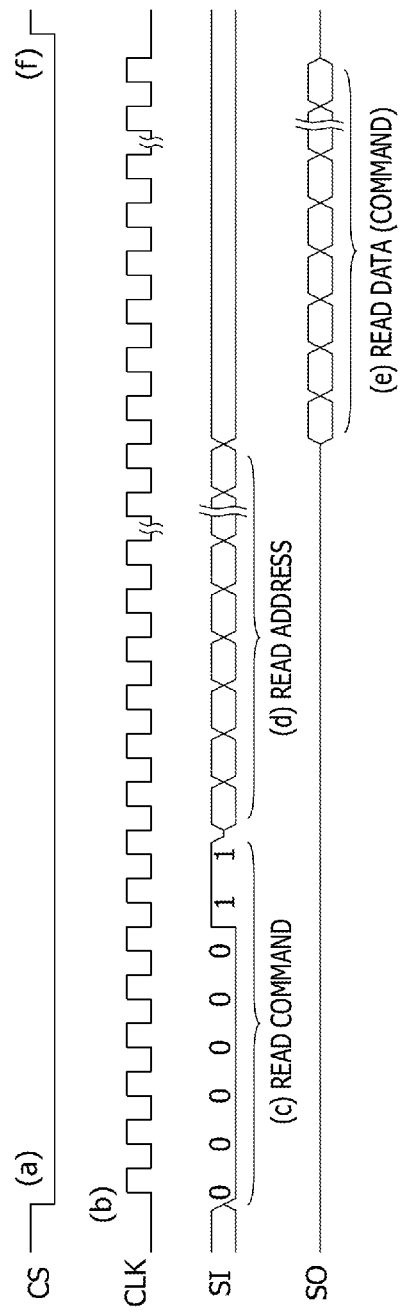
FIG. 6 is a diagram illustrating an example of an operation in Steps S104 and S122 illustrated in FIG. 5.

Each communication interface section SPI is connected to the connection control device CCNT and executes communication with the ROM according to the Serial Peripheral Interface (SPI) format. An example of communication by the SPI format is illustrated in FIG. 6. In the following description, the signal line by which the CPU and the connection control device CCNT are wired is referred to as an SPI bus. The SPI bus includes a chip select signal line CS (CS0, CS1, CS2), a clock signal line CLK (CLK0, CLK1, CLK2), a serial input line SI (SI0, SI1, SI2), and a serial output line SO (SO0, SO1, SO2). A bus request line BREQ (BREQ0, BREQ1, BREQ2) and a permission notification line BGNT (BGNT0, BGNT1, BGNT2) may be included in the SPI bus.

Each communication interface section SPI outputs the bus request BREQ to the arbitration section ARB of the connection control device CCNT in order to acquire bus rights of the memory bus MB connected to the ROM in a case where a read-out request is received from the cache controller CMCNT. The bus request BREQ is an example of a connection request which connects each CPU to the ROM.

For example, the address output from the processor core CORE indicates the ROM and the data (commands) corresponding to the address are not stored in the cache memory CM. In this case, the cache controller CMCNT determines a cache miss and outputs the read-out request to the communication interface section SPI. The cache memory CM does not hold the data (commands) immediately after the reset signal RST is released. Therefore, the cache controller CMCNT determines a cache miss in the cache memory CM during initialization of each CPU except for a case where the commands received by the receiving section RSV are stored in the cache memory CM. After the initialization of each CPU is completed, each cache controller CMCNT accesses the main storage device MM or a cache memory CM in a case where the address output from the processor core CORE indicates the main storage device MM corresponding to each CPU.

Each communication interface section SPI outputs the read-out request (read command and read address) to the ROM via the SPI bus and the selector SEL in a case where permission notification BGNT of the bus rights is received from the arbitration section ARB. The read address is included in the read-out request from the cache controller CMCNT. The communication interface section SPI receives the data (commands) output from the ROM via the connection control device CCNT and the SPI bus and outputs the received data (commands) to the cache controller CMCNT. Because the communication interface sections SPI1 and SPI2 are mounted to the CPU1 and CPU2, the CPU1 and CPU2 are able to read out commands from the ROM by accessing the ROM even in a case where the initialization program does not fit in the cache memory CM. The communication interface section SPI is an example of a transmitting and receiving section which transmits the read-out request to the ROM and receives unexecuted commands output from the ROM based on the read-out request.

The receiving sections RSV1 and RSV2 of the CPU1 and CPU2 are connected to the SPI bus of the CPU0 and detect and receive the address and commands between the communication interface section SPI0 of the CPU0 and the ROM. In a case where the address and commands are received, the receiving sections RSV1 and RSV2 output the received address and commands to the cache controller CMCNT1 and CMCNT2. Each cache controller CMCNT1 and CMCNT2 stores the upper order bit group of the received address in the tag area of the cache line identified by the middle order address group in each cache memory CM1 and CM2. Each cache controller CMCNT1 and CMCNT2 stores the received commands in the data area of the cache line in which the address is stored in each cache memory CM1 and CM2.

In FIG. 3, although the receiving sections RSV1 and RSV2 are connected to the SPI bus of the CPU0 which is wired to the inside of the connection control device CCNT, the receiving sections may be connected to the SPI bus of the CPU0 side. In this case, it is possible to shorten the length of the wiring which connects the receiving sections RSV1 and RSV2 to the SPI bus of the CPU0 compared to FIG. 3, and it is possible to reduce the wiring area. The receiving sections RSV1 and RSV2 may be connected to the memory bus MB instead of being connected to the SPI bus of the CPU0.

The CPU1 and CPU2 are able to receive the commands stored in the ROM through the receiving sections RSV1 and RSV2 without accessing the ROM and it is possible to avoid a conflict in the access to the ROM. It is possible for the receiving sections RSV1 and RSV2 to receive only the address and commands transferred between the CPU0 and the ROM by connecting the receiving sections RSV1 and RSV2 to the SPI bus of the CPU0. For example, in a case where the storage capacity of the cache memory CM1 is smaller than the storage capacity of the cache memory CM2, the CPU1 accesses the ROM and reads out the commands, via the communication interface section SPI1, from the ROM in the period in which the CPU2 stores the commands in the cache memory CM2. In this case, it is possible for the receiving section RSV2 of the CPU2 to receive only the address and commands transferred between the CPU0 and the ROM without receiving the address and the commands transferred between the CPU1 and the ROM via the communication interface sections SPI 1. As a result, it is possible to restrict misoperations of the parallel computer 100A in the initialization process which executes the commands (initialization program) stored in the ROM.

The receiving section RSV0 of the CPU0 is not connected to the SPI bus and does not operate. By mounting the receiving section RSV0 which does not operate in the CPU0, the CPU0, CPU1, and CPU2 can be designed in common, and it is possible to reduce the design costs compared to a case of designing the CPU0 independently.

The arbitration section ARB of the connection control device CCNT arbitrates the bus requests BREQ0 to BREQ2 from the CPU0 to CPU2 and outputs the permission notification BGNT (BGNT0 to BGNT2) to the CPU (that is, the CPU which permits the use of the memory bus MB) selected through the arbitration. The arbitration section ARB outputs the selection information SINF which indicates the CPU selected through arbitration to the selector SEL.

The selector SEL includes a switch which connects any SPI bus of the CPU0 to CPU2 to the memory bus MB based on the selection information SINF from the arbitration section ARB. The example illustrated in FIG. 3 illustrates a state in which SPI bus of the CPU0 is connected to the memory bus MB via the selector SEL. The selector SEL is an example of a connection switching section which connects the ROM to any of the CPUs based on the arbitration results by the arbitration section ARB.

Figure 4:
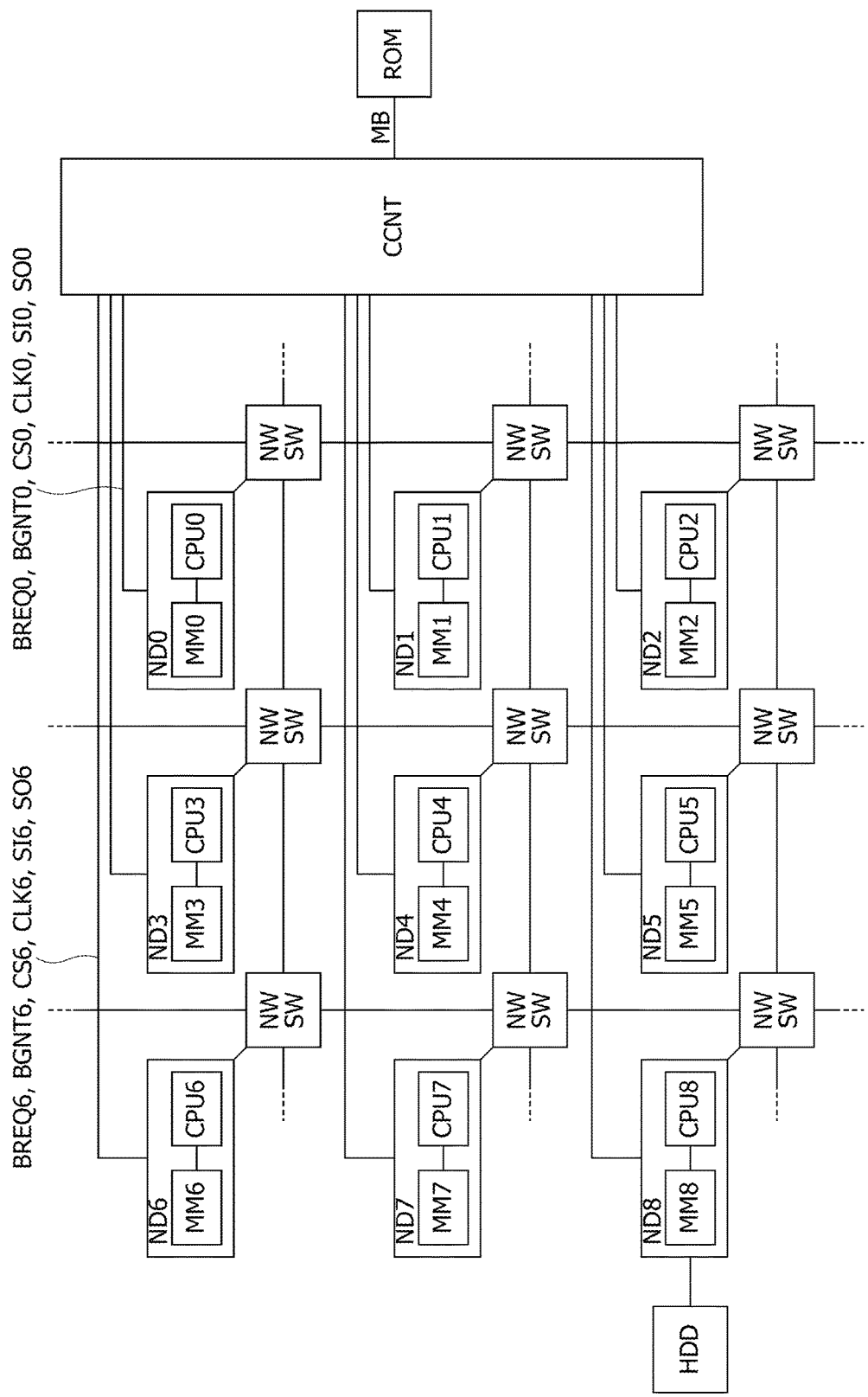
FIG. 4 is a diagram illustrating an example of a network configuration of the parallel computer illustrated in FIG. 3.

FIG. 4 illustrates an example of a network configuration of the parallel computer 100A illustrated in FIG. 3. The parallel computer 100A has a two-dimensional mesh network and includes a node ND (ND0 to ND8) which includes a pair of the respective CPU (CPU0 to CPU8) and the respective main storage device MM (MM0 to MM8) and a network switch NWSW which is connected to each node ND. Each node ND is connected to other nodes ND via a network switch NWSW. Each CPU is connected to the connection control device CCNT via a signal line which is independent of the two-dimensional mesh network.

In the example illustrated in FIG. 4, the node ND8 which includes the CPU8 and the main storage device MM8 is connected to the hard disk drive HDD. The hard disk drive HDD is an example of the second storage device. Through the operation illustrated in FIG. 5, described later, after the initialization of each CPU completes and the hardware becomes operable, a program, such as an OS is first loaded from the hard disk drive HDD to the main storage device MM8 of the node ND8. Thereafter, the program, such as an OS, loaded to the main storage device MM8 is sequentially loaded to the main storage device MM of the other nodes ND via the network switch NWSW. The parallel computer 100A may include another network such as a two-dimensional torus network which connects the networks switches NWSW in a ring shape.

Figure 5:
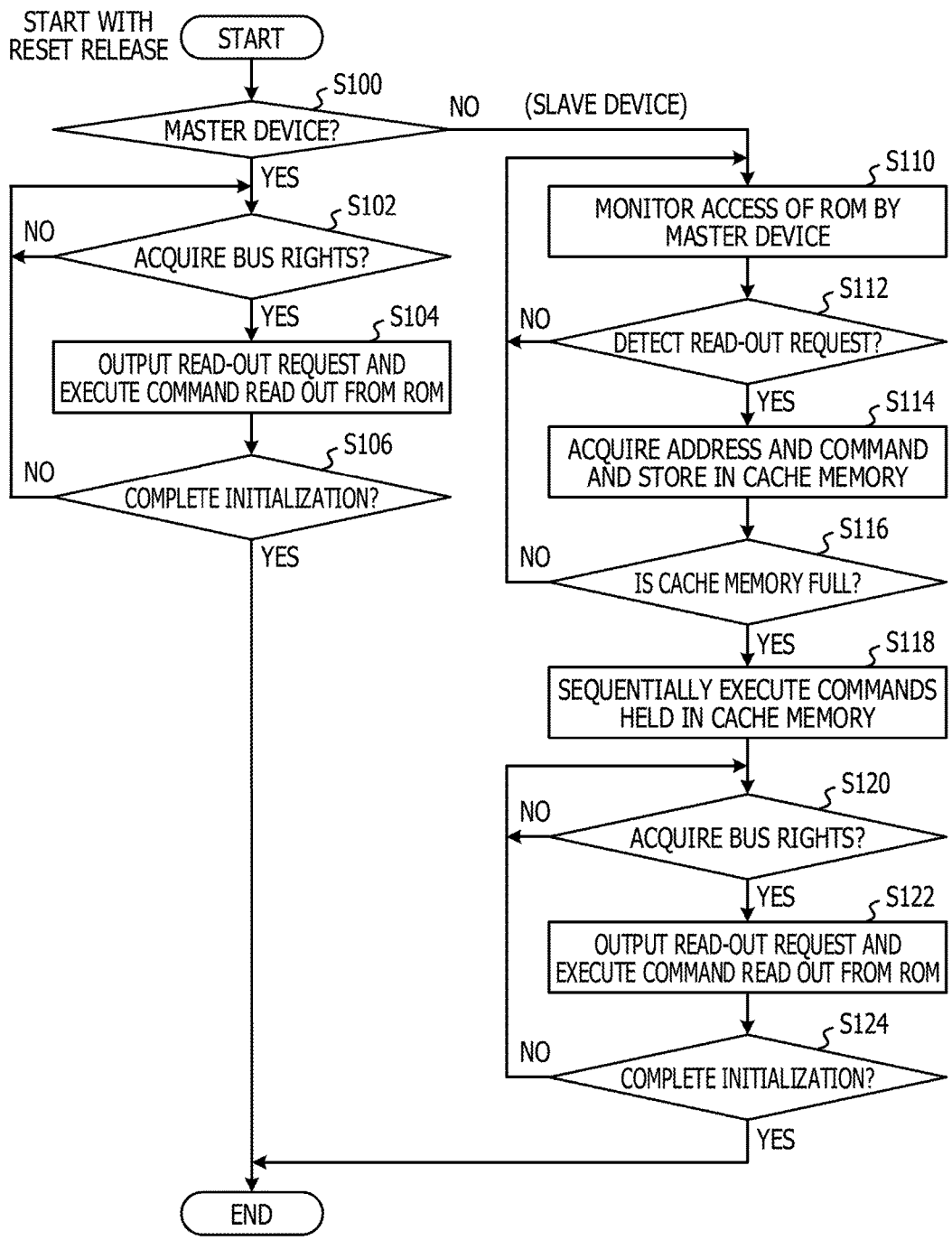
FIG. 5 is a diagram illustrating an example of an initialization process of the parallel computer illustrated in FIG. 3.

FIG. 5 illustrates an example of the initialization process of the parallel computer 100A illustrated in FIG. 3. The operation illustrated in FIG. 5 illustrates the initialization method of the parallel computer 100A executed by each CPU illustrated in FIG. 3. The flow illustrated in FIG. 5 is begun based on the release of the reset signal RST. Release of the reset signal RST is an example of a startup instruction which starts the parallel computer.

The operation of the CPU0 which is the master device is represented by Steps S100, S102, S104, and S106 and is realized by the hardware of the CPU0. The operation of the CPU1 and CPU2 which are slave devices is represented by Steps S110, S112, S114, S116, S118, S120, S122, and S124 and is realized by the hardware of the CPU1 and CPU2. The Steps S110 to S124 executed by the CPU1 and CPU2 which are slave devices may be realized by the startup program executed by the processor cores CORE1 and CORE2. In this case, each processor core CORE1 and CORE2 executes the startup program stored in advance in the nonvolatile built-in memory in each CPU1 and CPU2 based on the release of the reset signal RST.

First, in Step S100, each CPU determines if the CPU is either a master device or a slave device based on the logical level of the master terminal MST. In the case of a master device (CPU0), the operation is transitioned to the Step S102 and, in the case of a slave device (CPU1, CPU2), the operation is transitioned to Step S110.

In Step S102, the master device outputs the bus request BREQ to the arbitration section ARB and acquires the bus rights. In a case where the master device receives the permission notification BGNT from the arbitration section ARB and acquires the bus rights, the master device transitions the operation to Step S104. In a case where the permission notification BGNT is not received, the master device repeatedly executes Step S102 until the bus rights are acquired.

In Step S104, the communication interface section SPI of the master device outputs the read-out request to the ROM, receives the commands read out from the ROM, and executes the received commands. Next, in the Step S106, the master device finishes the operation in a case where the initialization of the CPU is completed, that is, in a case where all of the commands which initialize the CPU are read out from the ROM and executed. Meanwhile, in a case where the initialization of the CPU is not completed, the master device returns the operation to Step S102 and acquires the bus rights in order to read out the next command from the ROM.

Meanwhile, in Step S110, the receiving section RSV of the slave device uses the signal transferred to the SPI bus of the master device and monitors the access (read-out request) of the ROM by the master device. Next, in Step S112, the receiving section RSV of the slave device transitions the operation to Step S114 in a case where the read-out request is detected. The receiving section RSV repeats the steps S110 and S112 until the read-out request is detected.

In Step S114, the receiving section RSV of the slave device acquires the address (read address) included in the read-out request and the command read out from the ROM and outputs the acquired address and commands to the cache controller CMCNT. The cache controller CMCNT stores the address and commands from the receiving section RSV in the cache memory CM.

Next, in Step S116, the slave device transitions the process to Step S118 in a case where the cache memory CM becomes full, that is, in a case where the storage area of the cache memory CM which stores the commands is insufficient. In a case of a storage area which stores the commands remaining in the cache memory CM, the slave device returns the process to Step S110 and executes the operation of receiving the next read-out request. Whether the cache memory CM becomes full is detected by the cache controller CMCNT.

The cache controller CMCNT of the slave device which detects that the cache memory CM becomes full causes the processor core CORE to start fetching of the commands from the ROM in Step S118. For example, in the interior of the slave device, the release of the reset signal RST is masked until the cache memory CM becomes full. The processor core CORE is notified of the release of the reset signal RST based on the information indicating that the cache memory CM is full being output from the cache controller CMCNT.

Thereafter, the slave device starts fetching of commands stored in the ROM similarly to the master device which operates based on the release of the reset signal RST. However, in a case where the commands are stored in the cache memory CM, because a cache hit is determined, the commands are read out from the cache memory CM and executed by the processor core CORE. That is, it is possible for the slave device to execute the commands stored in the cache memory CM without accessing the ROM. In other words, it is possible for the slave device to execute the commands in a shorter time than in a case of executing the commands stored in the ROM.

After all commands stored in the cache memory CM are executed, the cache controller CMCNT determines the address output from the processor core CORE to be a cache miss and outputs the read-out request to the communication interface section SPI. The slave device executes Steps S120, S122, and S124, directly reads out and executes the unexecuted commands from the ROM, similarly to the Steps S102, S104, and S106 executed by the master device. In Step S124, the slave device finishes the operation in a case where the initialization of the CPU is completed.

In this way, the slave device directly accesses the ROM, executes the commands read from the ROM, and continues the initialization process, in a case where the cache memory CM becomes full. In so doing, even in a case where the initialization program does not fit into the cache memory CM, it is possible for the slave device to complete the initialization process.

In the slave device, in a case where all commands for initializing the CPU are able to be stored in the cache memory CM, the slave device executes Step S118 after all of the commands are stored in the cache memory CM by Step S114 and finishes the operation. In this case, the operations in Steps S120, S122, and S124 are not executed.

The slave device deletes the read address and commands held in the cache memory CM after completion of the initialization process and is used as a normal cache memory CM. In so doing, it is possible for the slave device to hold a portion of the commands and data stored in the main storage device MM in the cache memory CM.

FIG. 6 illustrates an example of the operation in Steps S104 and S122 illustrated in FIG. 5. That is, FIG. 6 illustrates an example in which the communication interface section SPI reads out the data (command) from the ROM according to the SPI format.

The communication interface section SPI sets the chip select signal CS to an enable level (for example, low level) after acquiring the bus rights in Steps S102 and S120 illustrated in FIG. 5 based on the read-out request from the cache controller CMCNT (FIG. 6(a)). The communication interface section SPI starts generation of the clock CLK and sequentially outputs the read command and the read address in synchronization with the clock CLK to the serial input line SI (FIG. 6(b), (c), (d)). For example, the read command is 8 bits (00000011) and the read address is 32 bits.

Next, the communication interface section SPI receives the read data (that is, commands) output from the ROM to the serial output line SO based on the read command and the read address (FIG. 6(e)). For example, the read data is 64 bits. Thereafter, the communication interface section SPI sets the chip select signal CS to a disabled level (for example, high level) and completes the read operation which reads out the commands from the ROM (FIG. 6(f)).

Although an example of accessing the ROM using the SPI format is illustrated in FIG. 6, the ROM may be accessed using another serial interface format such as an Inter-Integrated Circuit (I2C).

Figure 7:
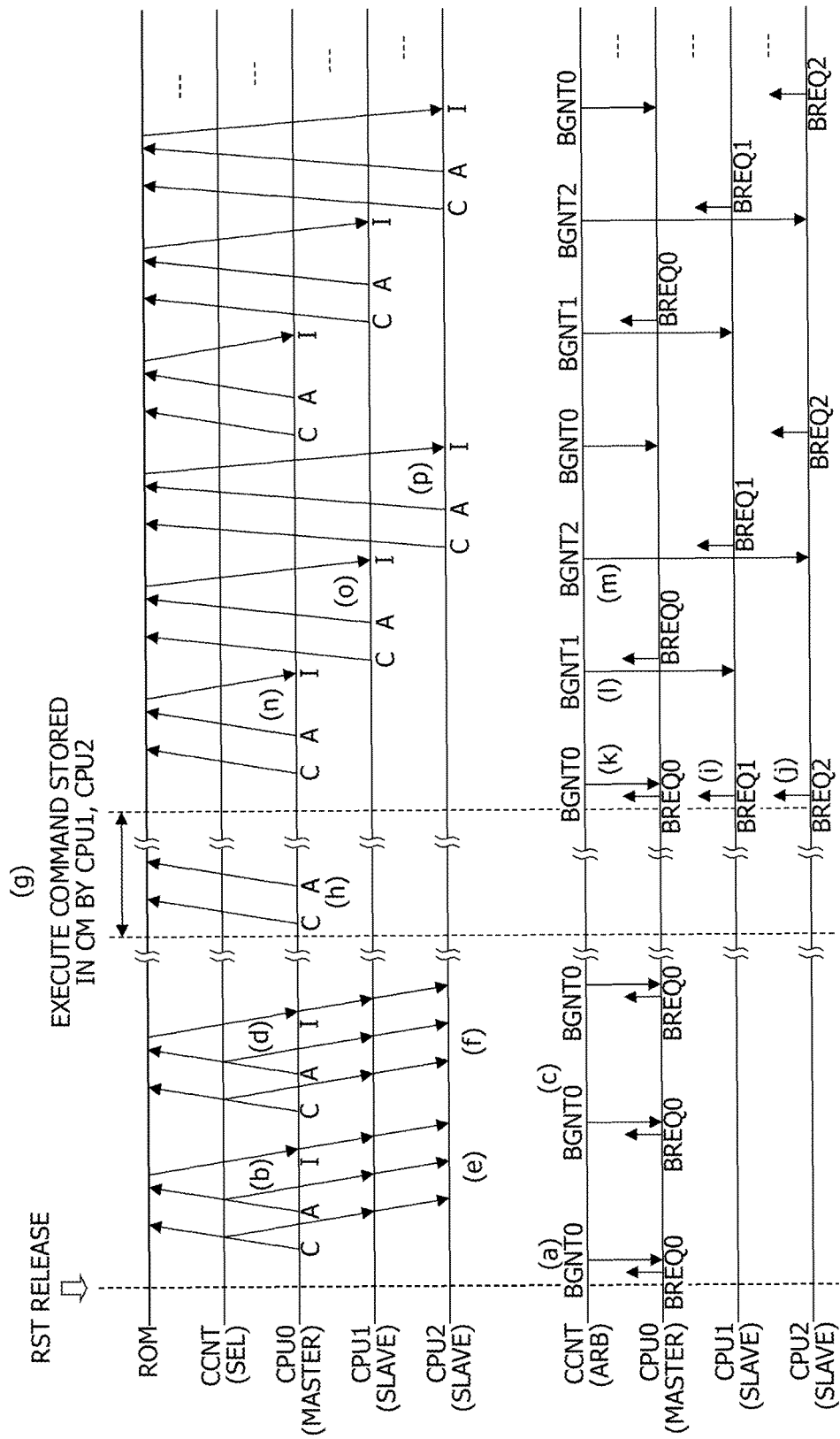
FIG. 7 is a diagram illustrating an example of a CPU operation in the initialization process of the parallel computer illustrated in FIG. 3.

FIG. 7 illustrates an example of the operation of the CPU0 to CPU2 in the initialization process of the parallel computer 100A illustrated in FIG. 3. When the reset signal RST is released due to powering up or the like of the parallel computer 100A, the CPU0 which is a master device outputs the bus request BREQ0 to the arbitration section ARB and receives the permission notification BGNT0 from the arbitration section ARB (FIG. 7(a)). The CPU0, as illustrated in FIG. 6, outputs the read-out request (read command C and read address A) to the ROM via the connection control device CCNT, receives the command I from the ROM via the connection control device CCNT and executes the received command I (FIG. 7(b)). The CPU0 repeatedly executes the acquisition of the bus rights according to the bus request BREQ0 and the reading and execution of the command I from the ROM based on the read-out request (FIGS. 7(c) and (d)).

The CPU1 and the CPU2 which are slave devices monitor the SPI bus connected to the CPU0 and detect the read command C. In a case where the read command C is detected, the CPU1 and CPU2 sequentially receive the read address A and the command I subsequent to the read command C from the SPI bus connected to the CPU0. The CPU1 and CPU2 store the received read address A and command I in the cache memory CM (FIGS. 7(e) and (f)).

The CPU1 and CPU2 execute the command I stored in the cache memory CM and start the initialization process in a case where the data area which stores the command I in each cache memory CM is insufficient (FIG. 7(g)). In the example illustrated in FIG. 7, because the storage capacities of the cache memories CM1 and CM2 of the CPU1 and CPU2 are the same as one another, the timings at which the CPU1 and CPU2 start the initialization process are the same. Even after the CPU1 and CPU2 start execution of the command I stored in the cache memory CM, the CPU0 repeatedly executes the acquisition of the bus right according to the bus request BREQ0 and the reading and execution of the command I from the ROM based on the read-out request (FIG. 7(h)).

The CPU1 and CPU2 output the bus requests BREQ1 and BREQ2, respectively, in order to read the remaining commands I which execute the initialization process from the ROM after all of the commands stored in each cache memory CM are executed (FIGS. 7(i) and (j)). The arbitration section ARB arbitrates the bus requests BREQ0, BREQ1 and BREQ2 and sequentially outputs the permission notification BGNT0, BGNT1, and BGNT2 (FIGS. 7(k), (l), and (m)). The CPU0 to CPU2 alternately access the ROM, read out the command I from the ROM, execute the read command I, and execute the initialization process, respectively (FIGS. 7(n), (o), and (p)).

Figure 8:
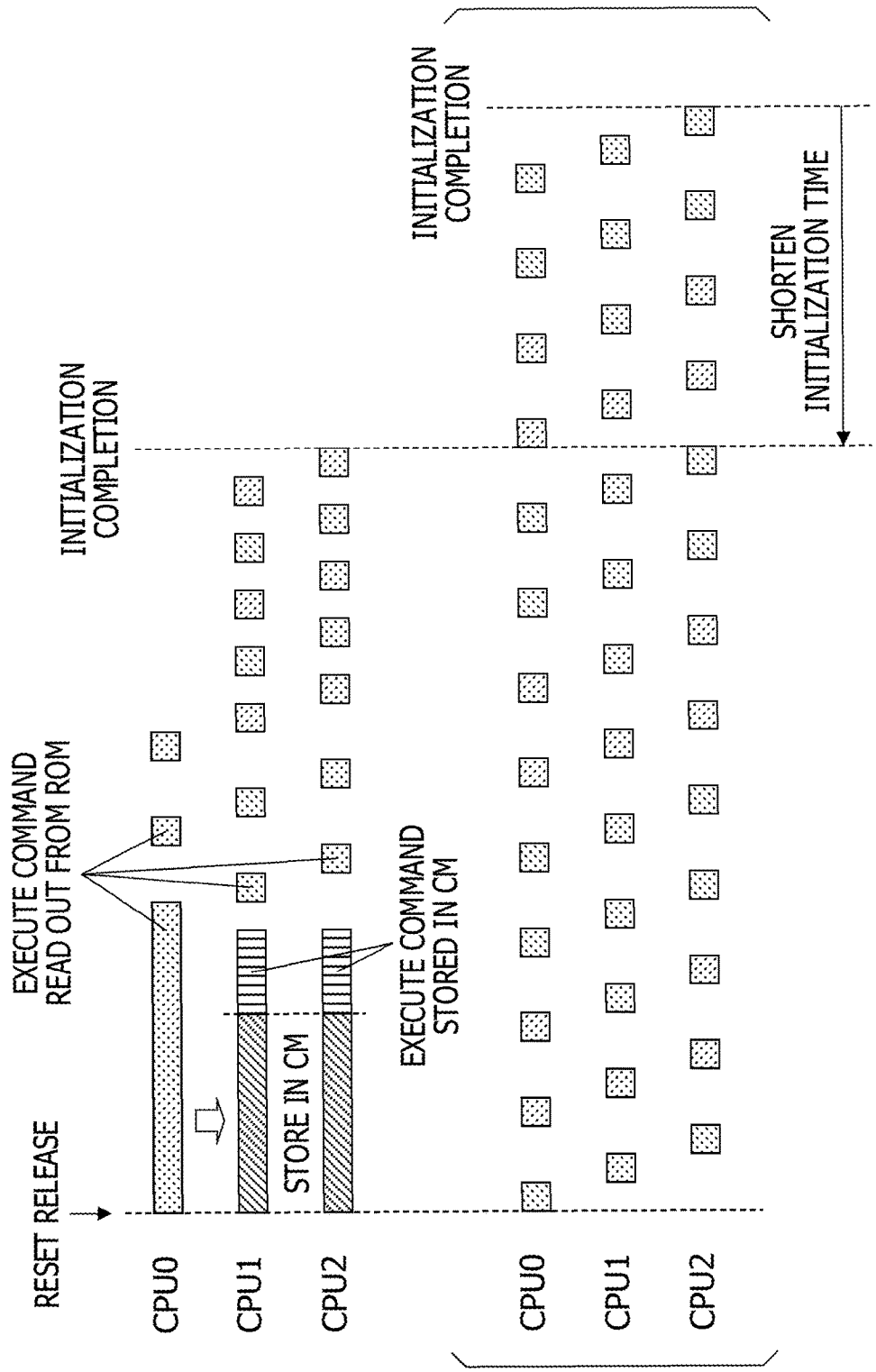
FIG. 8 is a diagram illustrating an example of the effects of shortening the initialization time of the parallel computer illustrated in FIG. 3.

FIG. 8 illustrates an example of the effects of shortening the initialization time of the parallel computer 100A illustrated in FIG. 3. In FIG. 8, the shaded rectangles indicate the operation in which the CPU0 to CPU2 access the ROM and execute the commands read from the ROM. The rectangles marked with oblique lines indicate the operation in which the CPU1 and CPU2 receive the read address and commands transferred to the SPI bus of the CPU0 and store the received read address and commands in the cache memory CM. The rectangles marked with vertical lines indicate an operation in which the CPU1 and CPU2 execute the commands stored in the cache memory CM. The operations surrounded by the square brackets on the lower side of FIG. 8 indicate operations in which the CPU0 to CPU2 each read out and execute the commands from the ROM without the CPU1 and CPU2 using the cache memory CM.

In the example illustrated in FIG. 8, the storage capacities of the cache memories CM of the CPU1 and CPU2 are the same as one another. Therefore, the periods (rectangles marked by oblique line) in which the read address and commands are stored in the cache memory CM are the same as one another for the CPU1 and CPU2, and the periods (rectangles marked by vertical lines) in which the commands stored in the cache memory CM are executed are the same as one another for the CPU1 and CPU2.

In the example illustrated in FIG. 8, because the CPU1 and CPU2 store the commands in the cache memory CM and only the CPU0 accesses the ROM until all of the stored commands are executed, it is possible to restrict lowering of the transfer rate of commands to the CPU0 due to access conflicts. It is possible for the CPU1 and CPU2 to receive the read address and the command at the same transfer rate as that of the CPU0 because the read address and commands transferred to the SPI bus of the CPU0 are received. Because fetching of the commands stored in the cache memory CM becomes a cache hit, it is possible for the CPU1 and CPU2 to more efficiently execute the commands than in a case where the command stored in the ROM is fetched. As a result, it is possible to advance the time at which the CPU0 to CPU2 complete initialization, and it is possible to shorten the initialization time of the parallel computer 100A compared to a case in which the CPU0 to CPU2 each read out and execute commands from the ROM.

Above, it is also possible in the embodiments illustrated in FIGS. 3 to 8 to shorten the time until the parallel computer 100A completes startup compared to a case where the CPU0 to CPU2 each read out and execute commands from the ROM, similarly to the embodiments illustrated in FIGS. 1 and 2. That is, the CPU1 and CPU2 are able to receive the commands stored in the ROM through the receiving sections RSV1 and RSV2 without accessing the ROM and it is possible to avoid a conflict in the access to the ROM.

In the embodiments illustrated in FIGS. 3 to 8, it is possible for the CPU1 and CPU2 to directly access the ROM, execute the commands read out from the ROM, and continue the initialization process in a case where the cache memory CM becomes full. In so doing, even in a case where the initialization program does not fit into the cache memory CM, it is possible for the CPU1 and CPU2 to complete the initialization process.

Figure 9:
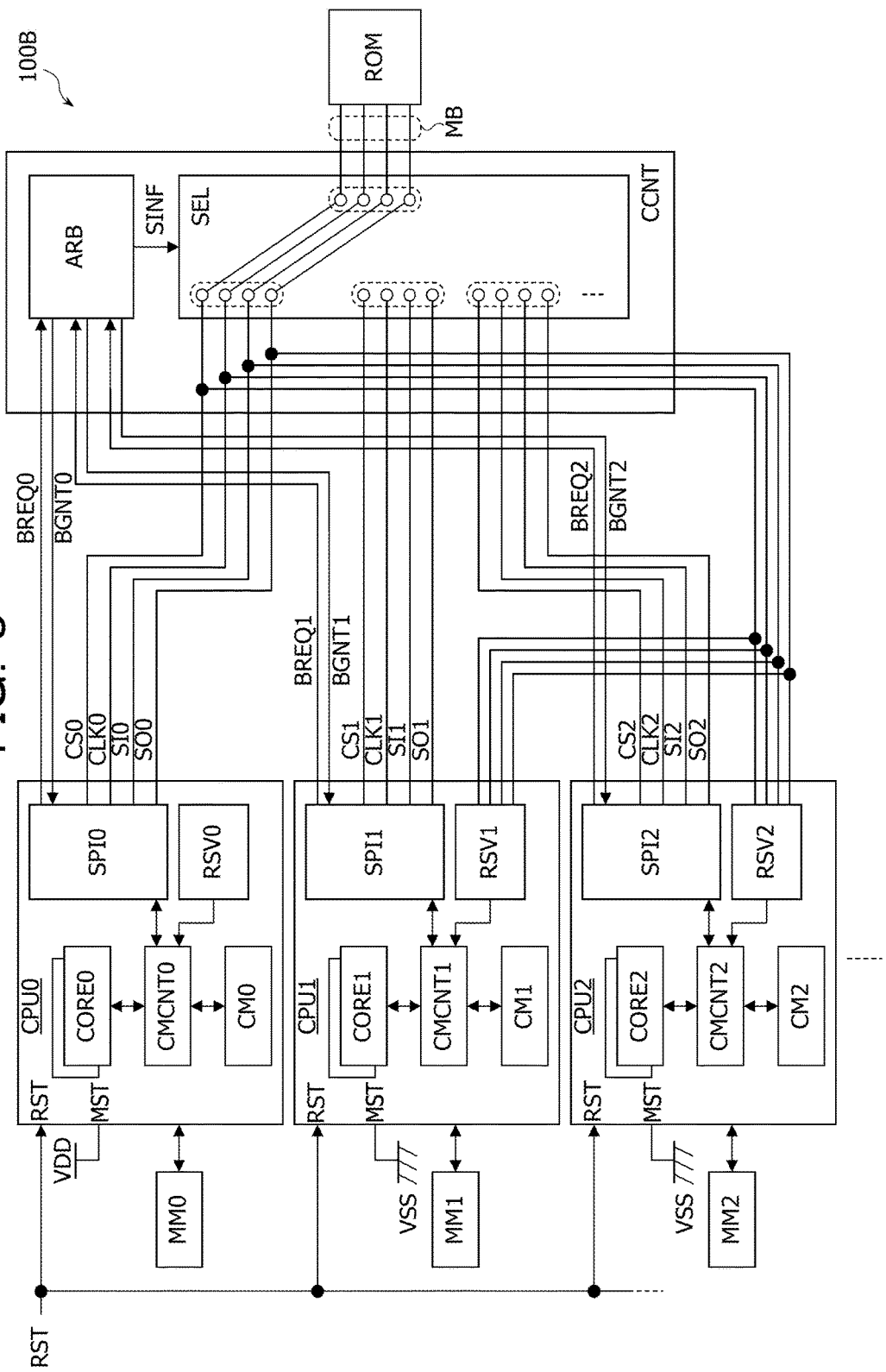
FIG. 9 is a diagram illustrating another embodiment of a parallel computer, an initialization method of a parallel computer, and a startup program.

FIG. 9 illustrates another embodiment of the parallel computer, the initialization method of a parallel computer, and the startup program. The same or similar elements as the elements described by the embodiment illustrated in FIG. 3 are given the same reference numbers and detailed description thereof will not be provided. In the parallel computer 100B of the embodiment, each CPU (CPU0, CPU1, and CPU2) includes a plurality of processor cores CORE (CORE0, CORE1, and CORE2). The other configurations of the parallel computer 100B are similar to the configurations of the parallel computer 100A illustrated in FIG. 3.

Each processor core CORE0 of the CPU0 which is the master device accesses the ROM, reads out and executes the commands (initialization program) from the ROM, and initializes the CPU0 based on the release of the reset signal RST. Each processor core CORE1 of the CPU1 which is a slave device awaits the command being stored in the cache memory CM1, executes the commands (initialization program) stored in the cache memory CM1, and initializes the CPU1, based on the release of the reset signal RST. Each processor core CORE2 of the CPU2 which is a slave device awaits the commands being stored in the cache memory CM2, executes the commands (initialization program) stored in the cache memory CM2, and initializes the CPU2, based on the release of the reset signal RST. Each processor core CORE1 and CORE2 reads out and executes the remaining commands from the ROM in a case where the initialization is not completed only by execution of the commands stored in the cache memory CM (that is, a case where the initialization program is not stored in the cache memory CM). In so doing, even in a case in which the storage capacity of the cache memory CM is smaller than the capacity of the initialization program, the initialization process is continued by each processor core CORE1 and CORE2.

Figure 10:
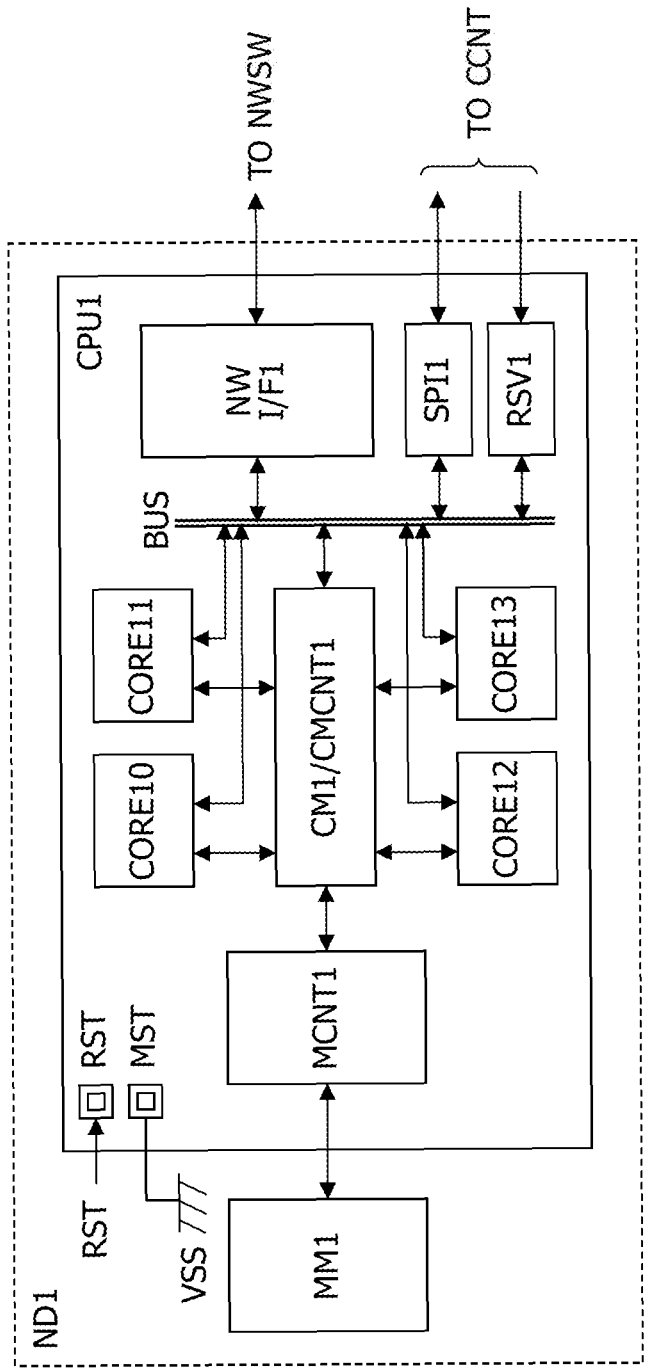
FIG. 10 is a diagram illustrating an example of a node which includes a CPU1 illustrated in FIG. 9.

FIG. 10 illustrates an example of a node ND1 which includes the CPU1 illustrated in FIG. 9. The CPU0 and CPU2 also include the same or similar configurations as in FIG. 10. The network configuration of the parallel computer 100B is similar to that in FIG. 4. In FIG. 10, the doubled square mark indicate external terminals. The external terminal is a pad on the semiconductor chip (CPU1) or is a bump or lead on the package in which the semiconductor chip (CPU1) is housed, or the like. The master terminal MST is connected to the ground line VSS on the substrate on which the CPU1 chip is mounted.

The CPU1 includes a plurality of processor cores CORE1 (CORE10, CORE11, CORE12, CORE13), a memory controller MCNT1, a cache memory CM1, and a cache controller CMCNT1. The CPU1 includes a system bus BUS, a network interface NWI/F1, a communication interface section SPI1, and a receiving section RSV1.

The processor cores CORE10 to CORE13, the cache controller CMCNT1, the network interface NWI/F1, the communication interface section SPI1, and the receiving section RSV1 are connected to one another via the system bus BUS. The network interface NWI/F1 is connected to another node ND via the network switch NWSW illustrated in FIG. 4.

Figure 11:
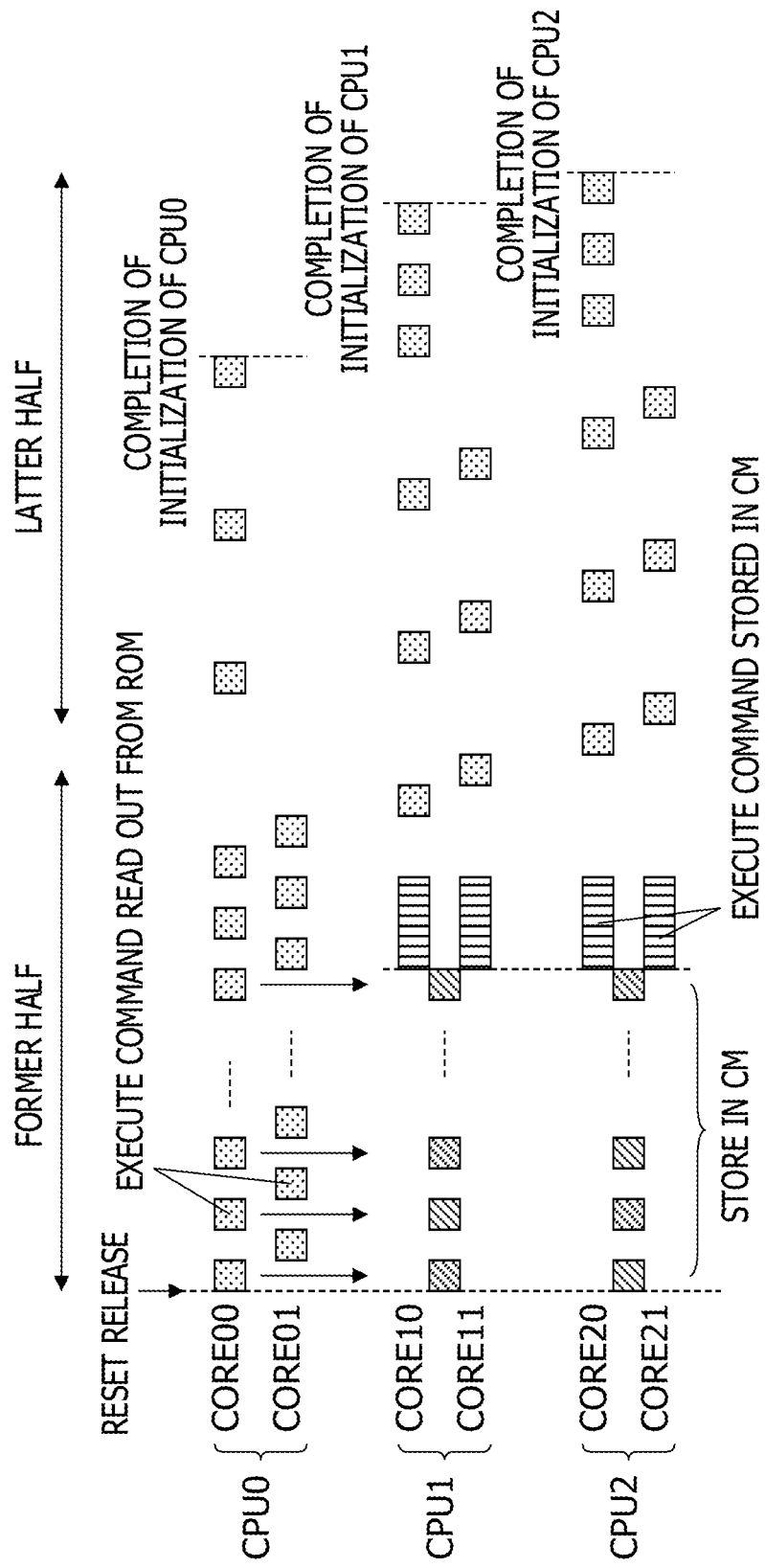
FIG. 11 is a diagram illustrating an example of the effects of shortening the initialization time of the parallel computer illustrated in FIG. 9.

FIG. 11 illustrates an example of the effects of shortening the initialization time of the parallel computer 100B illustrated in FIG. 9. A detailed description of the same elements as FIG. 8 will not be provided. In FIG. 11, for ease of description, each CPU includes two processor cores CORE.

The operation illustrated in FIG. 11 is the same as the operation illustrated in FIG. 8 except for the plurality of processor cores CORE of each CPU each executing the initialization program. That is, the plurality of processor cores CORE of each CPU executes the initialization process by executing the initialization program stored in the ROM based on the release of the reset signal RST. The processor core CORE of each CPU executes the initialization process similarly to FIG. 5. Steps S110 to S124 illustrated in FIG. 5 may be realized by a startup program executed by each processor core CORE of the CPU1 and CPU2.

In a case where the CPU0 includes two processor cores CORE, because each processor core CORE reads out the commands from the ROM, the read-out request (read command and read address) and commands are transferred two at a time to the SPI bus of the CPU0. The receiving section RSV of each CPU1 and CPU2 detects the read commands of the earliest access from the two accesses of the ROM based on the read address and stores the read address and commands in the cache memory CM. In other words, in a case where the same read address is continuously detected, the receiving section RSV determines the earliest read address to be enabled. The processor core CORE00 of the CPU0 may output identification information which indicates access by the processor core CORE00 with the read command. In this case, it is possible for the receiving section RSV of the CPU1 and CPU2 to receive the read address and commands transferred between the processor core CORE00 and the ROM based on the identification information.

In the CPU1, in a case where the storage area of the cache memory CM which stores the commands becomes insufficient, the processor cores CORE10 and CORE11 output a memory access request in order to read out and execute the commands stored in the cache memory CM. The memory access request is arbitrated, for example, by the arbitration section provided in the cache controller CMCNT. The cache controller CMCNT alternately receives the memory access request from the processor cores CORE10 and CORE11 and outputs the received memory access request to the cache memory CM. The processor cores CORE10 and CORE11 alternately receive the commands from the cache memory CM and execute the initialization process. The processor cores CORE20 and CORE21 of the CPU2 also operate similarly to the processor cores CORE10 and CORE11.

Each processor core CORE of the CPU0 accesses the ROM, alternately reads out the commands from the ROM and executes the read-out commands based on the reset release, similarly to FIG. 8. Each processor core CORE of each CPU1 and CPU2 accesses the ROM, alternately reads out the commands from the ROM and executes the read-out commands after the commands stored in the cache memory CM are executed, similarly to FIG. 8. In this case, for example, the plurality of processor cores CORE of each CPU0 to CPU2 execute initialization of individual hardware or the like controlled by each processor core CORE. After initialization of the individual hardware or the like is completed, any one of the plurality of processor cores CORE executes initialization of the shared hardware or the like used by the plurality of processor cores CORE. In the example illustrated in FIG. 11, the processor cores CORE00, CORE10, and CORE20 execute initialization of the shared hardware or the like.

In this way, in the former half of the initialization process of each CPU, the plurality of processor cores CORE executes initialization of the individual hardware or the like, and in the latter half of the initialization process of each CPU, any of the processor cores CORE execute initialization of the shared hardware or the like. Because the number of processor cores CORE which access the ROM is large, accesses to the ROM easily come into conflict in the former half of the initialization process compared to the latter half of the initialization process.

In the embodiment, in the former half of the initialization process in which conflicting access to the ROM easily occurs, the CPU1 and CPU2 acquire the commands stored in the ROM without accessing the ROM. By executing an operation which avoids conflict in the period in which conflicting access to the ROM easily occurs, it is possible to further shorten the time until startup completes in the parallel computer 100B which includes a so-called multi-core type CPU.

Above, it is also possible in the embodiments illustrated in FIGS. 9 to 11 to shorten the time until the parallel computer 100B completes startup compared to a case where the CPU0 to CPU2 each read out and execute commands from the ROM, similarly to the embodiments illustrated in FIGS. 1 to 8. Furthermore, in the embodiment illustrated in FIGS. 9 to 11, even in a case where each CPU includes a plurality of processor cores CORE, it is possible to shorten the time until startup of the parallel computer 100B completes.

Figure 12:
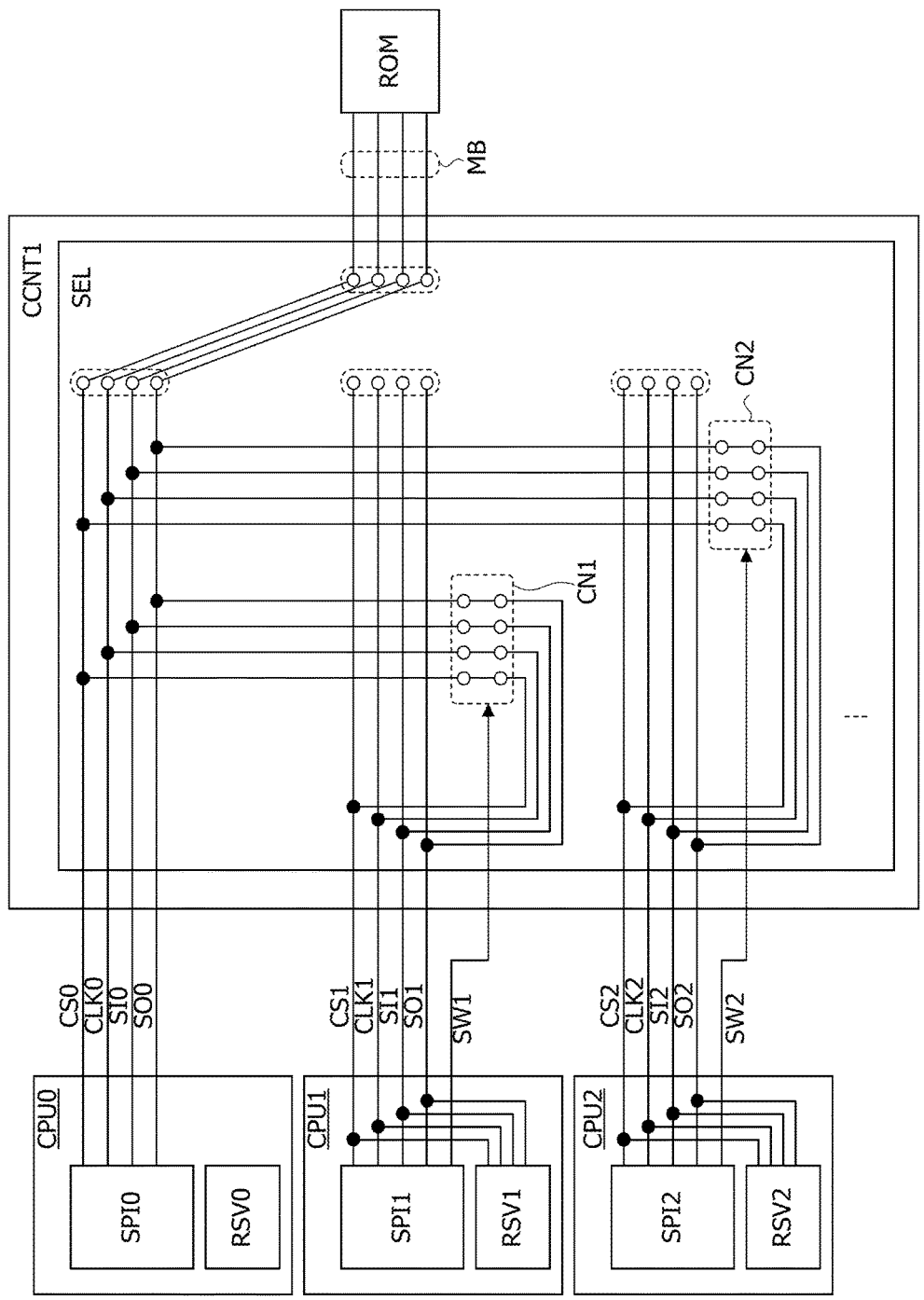
FIG. 12 is a diagram illustrating another example of the connection control circuit illustrated in FIGS. 3 and 9.

FIG. 12 illustrates another example of the connection control circuit CCNT illustrated in FIGS. 3 and 9. The connection control circuit CCNT1 illustrated in FIG. 12 adds connection sections CN1 and CN2 to the connection control circuit CCNT illustrated in FIGS. 3 and 9. In FIG. 12, description of the arbitration section ARB is not provided.

The connection section CN1 is arranged between the SPI bus of the CPU1 and the SPI bus of the CPU0 and the connection section CN2 is arranged between the SPI bus of the CPU2 and the SPI bus of the CPU0. The receiving section RSV1 is connected to the SPI bus of the CPU0 via the SPI bus of the CPU1 and the connection section CN1 and the receiving section RSV2 is connected to the SPI bus of the CPU0 via the SPI bus of the CPU2 and the connection section CN2.

The connection section CN1 connects the SPI bus of the CPU0 to the SPI bus of the CPU1 or disconnects the connection between the SPI bus of the CPU0 and the SPI bus of the CPU1 based on the switching signal SW1 from the communication interface section SPI1 of the CPU1. The connection section CN2 connects the SPI bus of the CPU0 to the SPI bus of the CPU2 or disconnects the connection between the SPI bus of the CPU0 and the SPI bus of the CPU2 based on the switching signal SW2 from the communication interface section SPI2 of the CPU2. The switching signal SW1 (SW2) is an example of a connection instruction which causes the SPI bus of the CPU0 to be connected to the SPI bus of the CPU1 (CPU2).

The communication interface section SPI1 outputs the switching signal SW1 which connects the SPI bus of the CPU0 to the SPI bus of the CPU1 in a case where the read address and commands transferred to the SPI bus of the CPU0 is detected by the receiving section RSV. Similarly, the communication interface section SPI2 outputs the switching signal SW2 which connects the SPI bus of the CPU0 to the SPI bus of the CPU2 in a case where the read address and commands transferred to the SPI bus of the CPU0 is detected by the receiving section RSV. That is, each communication interface section SPI1 and SPI2 connects the SPI bus of the CPU0 to the SPI bus of the respective CPU1 and CPU2 in a case where there is a surplus which stores the read address and the commands in the cache memory CM.

The communication interface section SPI1 sets the SPI bus of the CPU1 to a floating state while the SPI bus of the CPU0 is connected to the SPI bus of the CPU1 via the connection section CN1. Similarly, the communication interface section SPI1 sets the SPI bus of the CPU2 to a floating state while the SPI bus of the CPU0 is connected to the SPI bus of the CPU2 via the connection section CN2. It is possible for the receiving sections RSV1 and RSV2 to receive only the address and commands transferred between the CPU0 and the ROM by connecting the connecting sections CN1 and CN2 to the SPI bus of the CPU0.

By providing the connection section CN1 in the selector SEL, it is possible for the receiving section RSV1 to acquire the read-out request and commands transferred to the SPI bus of the CPU0 via the SPI bus of the CPU1. Similarly, by providing the connection section CN2 in the selector SEL, it is possible for the receiving section RSV2 to acquire the read-out request and commands transferred to the SPI bus of the CPU0 via the SPI bus of the CPU2. That is, it is possible for the receiving sections RSV1 and RSV2 to receive the read-out request and commands transferred to the SPI bus of the CPU0 without being directly connected to the SPI bus of the CPU0. In other words, it is possible for the receiving sections RSV1 and RSV2 to receive the read-out request and commands transferred to the SPI bus of the CPU0 using the SPI bus of the CPU1 and CPU2, respectively. As a result, compared to FIGS. 3 and 8, it is possible to reduce the number of signal lines which are wired between the CPU0 to CPU2 and the connection control device CCNT1 and it is possible to reduce the wiring area. As a result, it is possible to reduce the areas of the substrate to which the CPU0 to CPU2 are mounted.

FIG. 13 illustrates an example of the effects of shortening the initialization time of the parallel computer including the connection control circuit CCNT1 illustrated in FIG. 12. FIG. 13 illustrates a case of each CPU0 to CPU2 of the parallel computer which includes the connection control circuit CCNT1 illustrated in FIG. 12 including one processor core CORE similarly to FIG. 3. A detailed description of the same elements as FIG. 8 will not be provided.

For example, the storage capacity of the cache memory CM of the CPU1 is the same as the storage capacity of the cache memory CM of the CPU1 illustrated in FIG. 8, and the storage capacity of the cache memory CM of the CPU2 is larger than the storage capacity of the cache memory CM of the CPU2 illustrated in FIG. 8. That is, the number of commands which the cache memory CM of the CPU1 is able to store is smaller than the number of commands which the cache memory CM of the CPU2 is able to store.

Therefore, the timing at which the CPU1 starts the execution of the commands stored in the cache memory CM becomes earlier than the timing at which the CPU2 starts execution of the commands stored in the cache memory CM. The period in which the CPU1 executes the commands stored in the cache memory CM becomes shorter than the time in which the CPU2 executes the commands stored in the cache memory CM. Therefore, the CPU1 starts access to the ROM at an earlier timing than the CPU2 and reads out the commands from the ROM. The operation in a case where the storage capacities of the cache memories CM mounted to the CPU1 and CPU2 are the same becomes the same as in FIG. 8.

The CPU1 outputs the switching signal SW1 which indicates a disconnection instruction and disconnects the connection between the SPI bus of the CPU0 and the SPI bus of the CPU1 before executing the commands stored in the cache memory CM1. Similarly, the CPU2 outputs the switching signal SW2 which indicates a disconnection instruction and disconnects the connection between the SPI bus of the CPU0 and the SPI bus of the CPU2 before executing the commands stored in the cache memory CM2. Accordingly, in a case where the CPU1 executes access to the ROM, it is possible to restrict the influence of the voltage of the SPI bus of the CPU0 on the SPI bus of the CPU1. Similarly, in a case where the CPU2 executes access to the ROM, it is possible to restrict the influence of the voltage of the SPI bus of the CPU0 on the SPI bus of the CPU2. As a result, it is possible for the CPU1 and CPU2 to access the ROM normally and to read out the commands from the ROM. Even in a case where the storage capacities of the cache memories CM1 and CM2 differ from one another, it is possible for each CPU1 and CPU2 to respectively execute the initialization program and to execute the initialization process of each of CPU1 and CPU2.

Because the CPU2 stores more commands in the cache memory CM compared to the CPU2 in FIG. 8, the number of commands read out from the ROM is fewer compared to FIG. 8. Accordingly, compared to FIG. 8, it is possible to reduce the number of accessed to the ROM by the CPU0 to CPU2 and possible to reduce the access conflicts. As a result, it is possible to advance the time at which the CPU1 and CPU2 complete initialization and possible to further shorten the initialization time of the parallel computer. Even in a case where each CPU0 to CPU2 includes a plurality of processor cores CORE, it is possible to advance the time at which the CPU1 and CPU2 complete initialization, compared to FIG. 11.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel computer, comprising:
a first processor configured to
output, in response to an instruction for starting up the parallel computer, a first read-out request to a first storage device, the first read-out request causing the first storage device to transmit a command of an initialization process to the first processor,
execute the initialization process of the first processor by using the command received from the first storage device; and
a second processor configured to
monitor, in response to the instruction for starting up the parallel computer, a signal transmitted between the first processor and the first storage device,
detect, from the signal transmitted between the first processor and the first storage device, the command output from the first storage device,
execute the initialization process of the second processor by using the detected command.

2. The parallel computer according to claim 1, wherein the second processor comprises a cache memory,
the first read-out request output from the first processor includes an address at which the command is stored in the first storage device,
the second processor is configured to
detect, from the signal transmitted between the first processor and the first storage device, the first read-out request output from the first processor,
write the detected command into the cache memory while associating with the address indicated by the detected first read-out request,
read the command from the cache memory in response to an occurrence of an instruction fetch to the address indicated by the first read-out request,
execute the initialization process of the second processor by using the command read from the cache memory.

3. The parallel computer according to claim 2,
wherein the second processor is configured to
output, in a case where a storage area of the cache memory is insufficient to store the commands required for completing the initialization process, a second read-out request to the first storage device, the second read-out request causing the first storage device to transmit a remaining command of the initialization process,
execute the initialization process of the second processor by using the remaining command after using the command read from the cache memory.

4. The parallel computer according to claim 3, further comprising:
a connection control device configured to connect either of the first processor or the second processor to the first storage device based on a connection request to the first storage device received from each of the first processor and the second processor,
wherein the second processor is configured to detect the first read-out request and the command transmitted on a signal line, the signal line connected between the first processor and the connection control device.

5. The parallel computer according to claim 4,
wherein the connection control device is configured to arbitrate the connection request output from the first processor and the second processor, and
connect the first storage device to either of the first processor or the second processor based on the arbitrated results.

6. The parallel computer according to claim 3, further comprising:
a plurality of the second processor; and
a plurality of connection sections configured to connect the first processor to each of the plurality of second processor,
wherein each of the plurality of second processor is configured to output a connection instruction which instructs the connection of the first processor to a corresponding connection section from among a plurality of connection sections before commencing a detection operation of the first read-out request and the command transmitted between the first processor and the first storage device.

7. The parallel computer according to claim 6,
wherein each of the plurality of second processors is configured to output a disconnection instruction which disconnects a connection of the first processor to the corresponding connection section from among the plurality of connection sections before commencing the outputting the second read-out request to the first storage device so as to receive the remaining command of the initialization process.

8. The parallel computer according to claim 2,
wherein the second processor is configured to delete the address and the command stored in the cache memory after execution of the initialization process by using the command stored in the cache memory, and
the cache memory is configured to store a portion of information stored in a main storage device connected to the second processor with an address, at which the portion of the information is stored in the main storage device, after the address and the command are deleted from the cache memory.

9. The parallel computer according to claim 1, further comprising:
a second storage device configured to store a program to be executed after the initialization process;
a first main storage device connected to the first processor; and
a second main storage device connected to the second processor,
wherein the first processor is configured to execute a program transferred from the second storage device to the first main storage device after the initialization process is completed, and
the second processor is configured to execute a program transferred from the second storage device to the second main storage device after the initialization process is completed.

10. The parallel computer according to claim 1,
wherein each of the first processor and the second processor includes a plurality of processor cores, and
a portion of the commands output from the first storage device are executed by the plurality of processors and commands except the portion are executed by any of the plurality of processor cores.

11. An initialization method executable by a processor included in a parallel computer having a first processor and a second processor and a first storage device, the method comprising:
monitoring, in response to an instruction for starting up the parallel computer, a signal transmitted between the first processor and the first storage device,
detecting, from the signal transmitted between the first processor and the first storage device, a command output from the first storage device,
executing the initialization process of the second processor by using the detected command.

12. A non-transitory medium for storing a program that cause processors included in a parallel computer having a first processor and a second processor and a first storage device to execute a process, the process comprising:
as a process executed by the first processor,
outputting, in response to an instruction for starting up the parallel computer, a first read-out request to a first storage device, the first read-out request causing the first storage device to transmit a command of an initialization process to the first processor,
executing the initialization process of the first processor by using the command received from the first storage device; and
as a process executed by the second processor,
monitoring, in response to an instruction for starting up the parallel computer, a signal transmitted between the first processor and the first storage device,
detecting, from the signal transmitted between the first processor and the first storage device, the command output from the first storage device,
executing the initialization process of the second processor by using the detected command.

* * * * *